United States Patent [19]

Dola

[11] 3,902,168
[45] Aug. 26, 1975

[54] SURGE CURRENT INDICATOR

[75] Inventor: Frank Peter Dola, Port Richey, Fla.

[73] Assignee: AMP Incorporated, Harrisburg, Pa.

[22] Filed: May 28, 1974

[21] Appl. No.: 473,842

[52] U.S. Cl. ............................. 340/253 P; 324/133
[51] Int. Cl.² ......................................... G08B 21/00
[58] Field of Search ........ 340/253 P, 253 A, 253 R, 340/376; 324/102, 133; 335/204, 17

[56] References Cited
UNITED STATES PATENTS
3,210,750  10/1965  Leonard ........................ 340/253 A Primary Examiner—Thomas B. Habecker
Attorney, Agent, or Firm—Frederick W. Raring; Robert W. Pitts; Jay L. Seitchik

[57] ABSTRACT

Fault indicator for power cable comprises a housing which is mounted on the cable having a plunger therein which is movable between extended and retracted positions. The plunger is resiliently biased to its extended position but is held in its retracted position by a latch. A delatching vane of a material having high magnetic permeability is pivotally mounted in the housing adjacent to the cable. Upon passage of a surge current through the cable, which would be caused by the fault, the resulting electro-magnetic field causes the vane to swing about its pivotal axis and engage the latch so that the latch is disengaged from the plunger and the plunger moves to its extended position.

7 Claims, 8 Drawing Figures

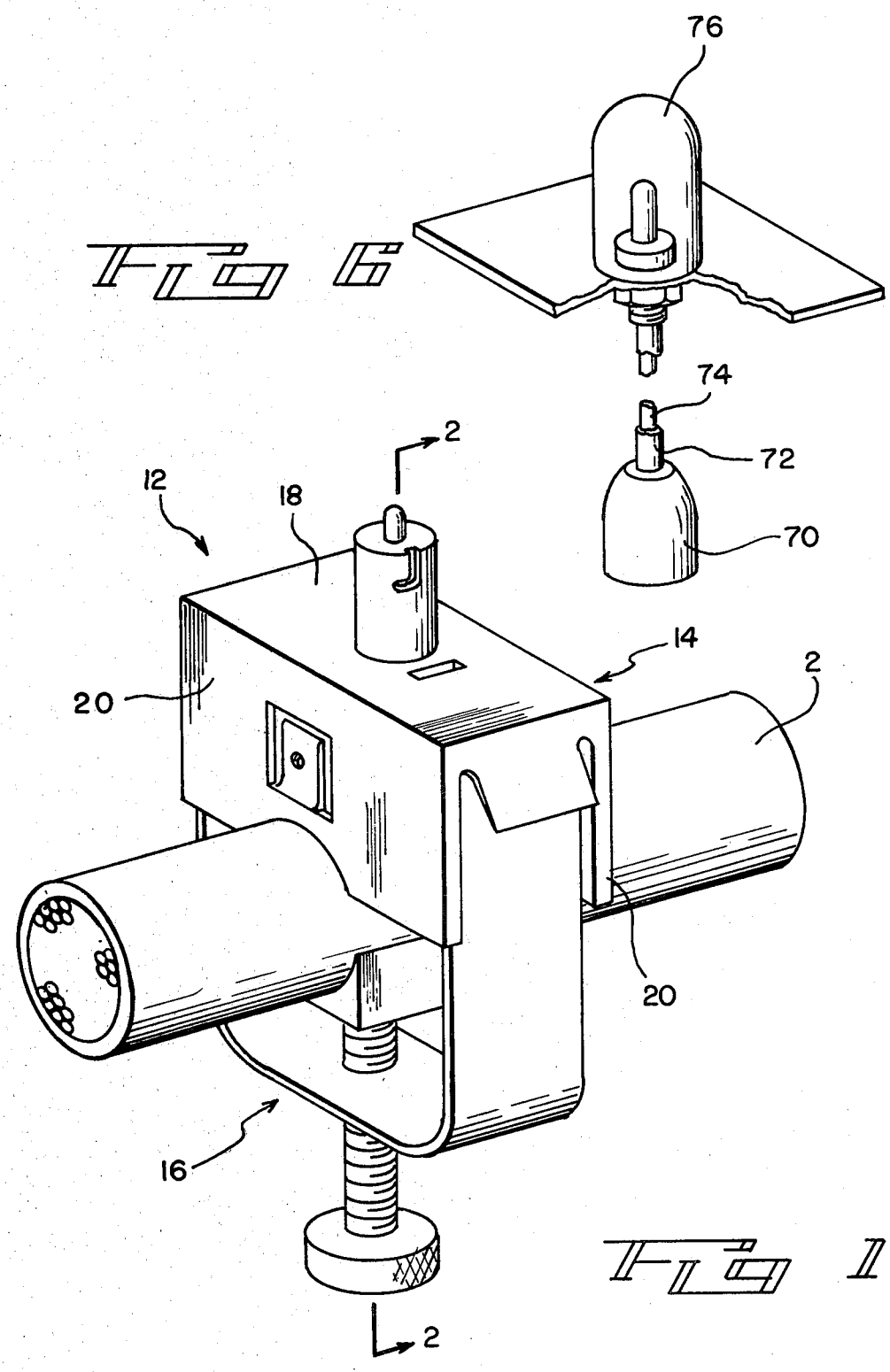

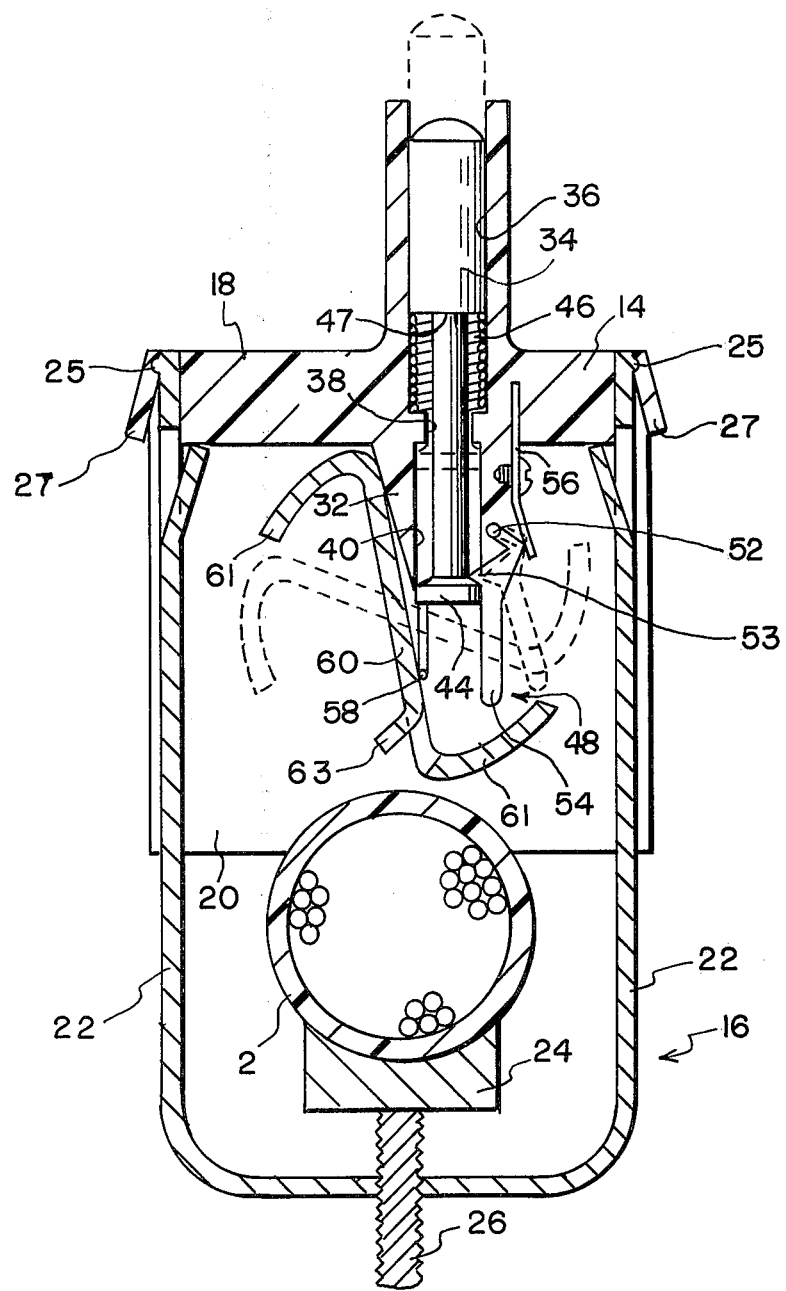

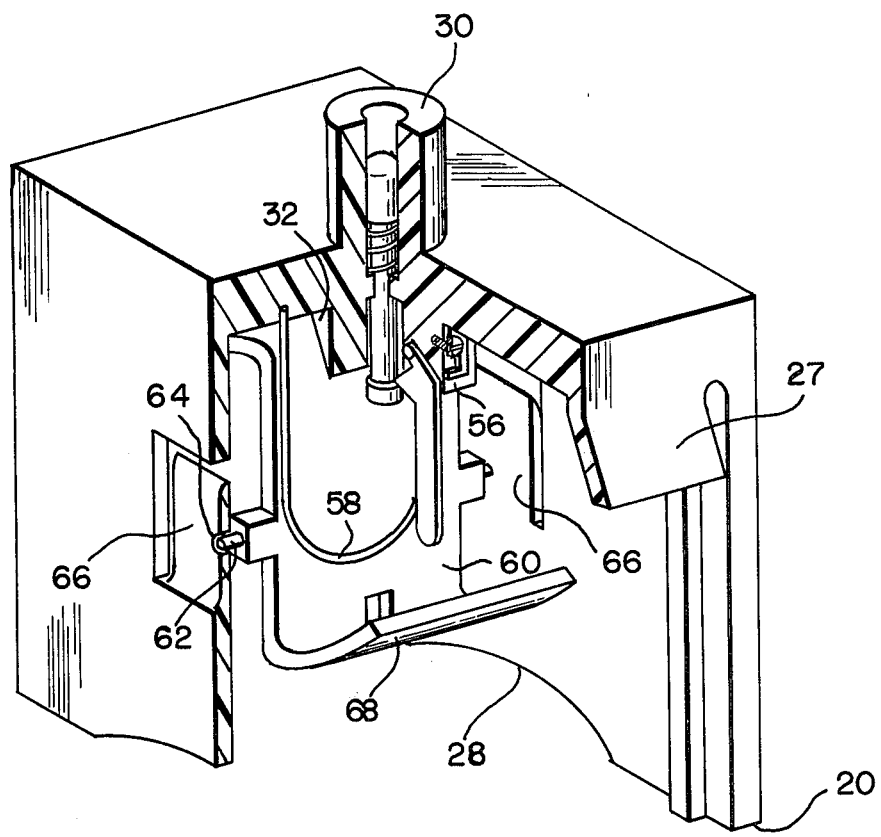

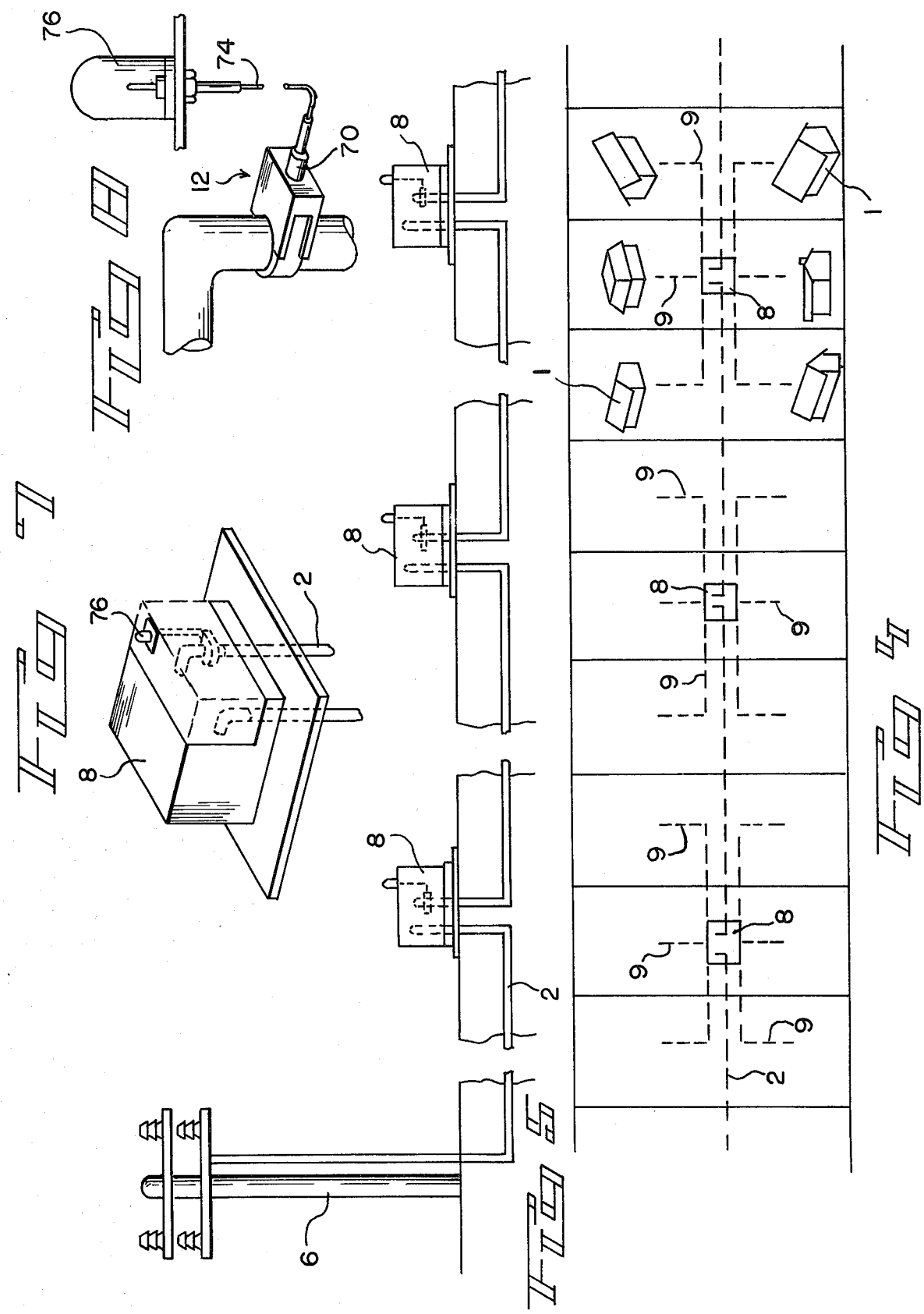

SURGE CURRENT INDICATOR

BACKGROUND OF THE INVENTION

This invention relates to fault indicators of the general type used to determine the location of a fault in an underground power distribution cable.

Underground power distribution cables are being used to an increasing extent in preference to elevated cables, particularly in residential areas. In a typical distribution system, the cable will extend from a utility pole to ground level and will extend underground through the area being served. At periodic locations, step-down transformers are located above ground and the cable extends to these transformers and the service conductors to the individual dwellings extend from the transformers to the dwellings.

On infrequent occassions, an underground power distribution cable may be severed, for example, by careless use of earth moving or drilling equipment or by deterioration of the cable as a result of some extraordinary chemical or galvanic corrosion effect. When this happens, the cable must be promptly repaired but it is sometimes difficult to determine the precise location of the fault. In order to aid in the location of the fault, devices called fault indicators are available which in one way or another, give some indication of the previous passage of a surge current through the cable. These fault indicators are thus placed on the cable at periodic intervals and are arranged to be visible from ground level. With the aid of such indicators, the technician can determine the approximate location of the fault by observing the locations of the indicators which have been tripped (i.e. which are on a portion of the cable through which a surge current has passed) and those which are not tripped.

The instant invention is directed to the achievement of an improved fault indicator which is compact, inexpensive to manufacture, which can be readily mounted on the cable, and which gives a positive indication of the passage of a surge current through the cable.

It is accordingly an object of the invention to provide an improved fault indicator for underground power distribution cables. A further object is to provide a fault indicator of simplified design which can be manufactured of some plastic parts. A further object is to provide an indicator which can be readily mounted on the cable and which has means for indicating at a remote location the previous passage of a surge current through the cable.

These and other objects of the invention are achieved in a preferred embodiment thereof which is briefly described in the foregoing abstract, which is described in detail below, and which is shown in the accompanying drawing in which:

FIG. 1 is a perspective view of a preferred form of fault indicator in accordance with the invention, this view showing the device mounted on the cable and showing the indicator plunger in its retracted position.

FIG. 2 is a view taken along the line 2—2 of FIG. 1.

FIG. 3 is a perspective view of the indicator with some parts broken away to show structural details thereof.

FIG. 4 is a schematic plan view of a typical power distribution system for a residential area illustrating a manner of installing indicators in accordance with the invention.

FIG. 5 is an elevation view showing portions of the distribution system of FIG. 4.

FIG. 6 is a fragmentary perspective view showing features of a remote indication device which can be used with the indicator of FIG. 1.

FIG. 7 is a perspective view of an above ground transformer which forms part of the distribution system of FIGS. 4 and 5.

FIG. 8 is a view illustrating the use of remote indication device of FIG. 6.

Referring first to FIGS. 4 and 5, a typical power distribution system for supplying power to a group of separate buildings such as dwelling houses 1 comprises a cable 2 which extends from a utility pole 6. The cable is, for the most part, buried beneath the ground but extends from the ground to the surface at periodic intervals to transformer housings 8 which are ordinarily mounted at ground level. The service cables 9 for the individual dwellings would extend from the transformers in the housings 8 as indicated.

Indicators of the type in accordance with the invention are mounted on the cable 2 at each of the transformer housings 8 and these indicators will be in one of two possible conditions; the first or untripped condition is the normal condition and indicates that a surge current has not at some previous time passed through the cable. An indicator in its tripped or second condition indicates that a high amperage surge circuit had passed through the cable.

If the cable 2 should be parted by the careless use of drilling equipment or for any other reason, a high amperage surge circuit will pass through the cable up to, but not beyond, the location of the break and it will trip the fault indicators on the portion of the cable through which it passes. The utility technician can then approximately locate the fault by simply observing which indicators have been tripped.

Referring now to FIG. 1, a fault indicator 12 in accordance with the invention comprises a housing which is composed of an upper channel-shaped part 14 and a stirrup-like member 16. The upper part 14, which is preferably of weather resistant plastic, has an end wall 18 and depending sidewalls 20. The stirrup, which may be of metal, has sides 22 and is assembled to the upper housing part by moving the ends of these sides through grooves on the opposite surfaces of sidewalls 20 until ears on the ends of the sides 22 latch against shoulders 25 (FIG. 3) on the upper housing part. These shoulders are provided on the inwardly facing sides of integral guide flaps 27 which guide the ends of the stirrups towards the shoulders. The device 12 is assembled to the cable 2 by positioning the upper housing part against the cable with the cable disposed in arcuate recesses 28 on the lower edges of sidewalls 20. A clamping pad 24 is then tightened against the lower side of the cable by means of a clamping screw 26 which is threaded through the bight portion of the stirrup 16.

The endwall 18 has an upwardly extending plunger housing 30 on its upper side and a depending plunger housing 32 on its lower side which is between the sidewalls 20. An opening extends through these plunger housings and has an enlarged diameter portion 36 extending inwardly from the upper end of housing portion 30, an intermediate restricted neck 38, and a second enlarged diameter portion 40 in the housing portion 32. An indicator plunger 34 is slidably mounted in this opening and has a relatively large diameter portion at its upper end which is slightly less than the diameter of the portion 36 of the opening. The lower portion 42 of this plunger is of reduced diameter so that it is movable through the restricted neck 38 and the lower end of the plunger is enlarged as shown at 44 for cooperation with a latch means as described below. Plunger 34 is normally biased upwardly, to the dotted line position of FIG. 2, by a spring 46 which is interposed between the shoulder 47 on the plunger and the inner end of the larger diameter portion 36 of the opening. When the indicator is in its untripped condition, the plunger is held in its retracted position shown by the solid lines in FIG. 2 by a latch means described below.

The latch means comprises a latch dog 48 having a ball and socket type pivotal connection 52 with the righthand side (as viewed in FIG. 2) of the plunger housing portion 32. Intermediate its ends, the latch dog has an ear 52 which is engageable with the inclined upper surface of the enlarged lower end 44 of the plunger and a latch arm 54 extends downwardly from this ear. The latch dog 48 may be a simple stamped part and is fitted in a narrow slot in the housing portion 32. A leaf spring 56 is secured to the housing by a screw as shown in FIG. 3 and bears against the latch dog to bias it in a clockwise direction to the solid line position shown in FIG. 2. When it is in this position, it retains the plunger in its retracted position but a slight movement of the arm 54 in a counterclockwise direction will release the plunger so that it will be moved by spring 46 to its extended position.

The passage of a surge current through the cable 2 is detected by a delatching vane 60 comprising a flat sheet of metal having a high magnetic permeability such as steel, and having integral arms on its side edges 62 which extend into openings 64 in the sidewalls 20. Advantageously, relatively thin walled ears 66 are provided in the sidewalls and are inwardly offset from the planes of the sidewalls and the holes 64 are in these ears 66. The ears, being separated from the sidewalls along three sides thereof are relatively flexible so that the vane 60 can be assembled to the upper housing part by merely moving it upwardly so that the arms 62 pass over the ears and flex them outwardly until the arms are in alignment with the holes 64 at which time the ears will move to their normal positions and the ends of the arms will be disposed in the openings 64. The vane 60 is resiliently biased to the positions shown in FIGS. 2 and 3 by a thin wire spring 58 which bears against one side of the vane as shown in FIG. 3.

The vane 60 has arcuately transversely extending end portions 61 and an obliquely extending lance 63 adjacent to the cable 2. These features provide the required mass of material to develop the force necessary to swing the vane member against the biasing force of spring 58 from the solid line position of FIG. 2 to the dotted line position when a surge current passes through the cable.

In use, a separate device 14 is placed on the cable adjacent to, or within, each of the above-ground transformers 4 shown in FIG. 4. At the time of installation, the indicator devices are set and this can be done by simply pressing the plunger downwardly until the latch dog 48 engages the lower end of the plunger.

If a surge current should pass through any portion of the cable 2 as a result of a break in the cable, the very brief high amperage surge current will establish an intense electro-magnetic filed which will cause the vanes in the indicator devices to be swung through a counterclockwise arc as shown in FIG. 2 and the plungers will move to their extended positions. The surge current would not flow past the fault so that the indicators in cable 2 beyond the fault would not be tripped. To locate the fault, the utility technician would walk from the utility pole along the path of the cable from one above-ground transformer to the next until he observed the first transformer having an indicator in its untripped condition. He would then know that the break is between the transformer he has under immediate observation and the next previous transformer which had been tripped.

Under some circumstances, it will be possible to mount the indicator 14 on the cable and in the transformer housing in a manner such that the plunger housing portion 30 will be visible from the outside of the transformer housing. If the indicator must be mounted on the cable and in the housing at a location which is not readily visible, as shown in FIGS. 7 and 8, a remote indicating device as shown in FIG. 5 can be used. This remote device comprises a coupling 70 which can be coupled to the upper end of the portion 30 of the plunger housing, a cable 72 having a slidable core therein and a housing 76 on the end of the cable. The housing or cover 76 can be mounted at any desired location, for example, in a hole in the transformer housing and when the indicator is tripped, the slidable core 74 in the cable 72 will move outwardly and beyond the end of the cable housing to show that the surge current has passed through that portion of the cable. The coupling 70 may be of any desired type, for example screw threads or a bayonet coupling having a pin adapted to enter in an L-shaped slot in the housing 30 as shown at 31. It will be understood that the cable and all parts of the remote indicator can be of a durable plastic material.

It will be apparent from the foregoing that an indicating device in accordance with the invention is extremely simple and easily assembled but is nonetheless durable and capable of giving a positive indication of the passage of a surge current through the portion of the cable on which it is mounted.

Changes in construction will occur to those skilled in the art and various apparently different modifications and embodiments may be made without departing from the scope of the invention. The matter set forth in the foregoing description and accompanying drawings is offered by way of illustration only.

What is claimed is:

1. An indicating device for indicating the passage of a surge current through an electrical power cable, said device comprising:

housing means, mounting means for mounting said device on said cable with portions of said housing means adjacent to, and spaced from, said cable, an indicator plunger slidably mounted in wall portions of said housing means, said indicator plunger being movable between a retracted position and an extended position, outer end portions of said plunger extending externally of said housing when said plunger is in said extended position, inner end portions of said plunger being within said housing when said plunger is in said retracted position, resilient means interposed between said plunger and said housing means, said resilient means normally biasing said plunger to said extended position, disengageable latch means in said housing means, said latch means being effective, in its latched condition, to hold said plunger in said retracted position against the biasing force of said resilient means, and magnetically responsive delatching means in said housing means, said magnetically responsive means being movable under the influence of a magnetic field into engagement with said latch means to disengage said latch means from said plunger whereby, upon mounting said device on said cable and latching said plunger in said retracted position, said plunger will be unlatched upon passage of a surge current through said cable and said plunger will be moved to said extended position.

2. An indicating device as set forth in claim 1, said delatching means comprising delatching vane means rotatably mounted in said housing, spring means biasing said vane means to a position in which said vane is not in engagement with said latch means, said vane being rotatably movable to a second position in which said vane engages said latch means to disengage said latch means from said plunger.

3. An indicating device as set forth in claim 2, said vane being mounted for rotation in said housing on an axis extending parallel to, and being spaced from, said cable.

4. An indicating device as set forth in claim 3, said vane comprising a plate-like member, said axis extending centrally through said plate-like member.

5. An indicating device as set forth in claim 4, said housing comprising an end wall which is spaced from said cable and spaced apart sidewalls which extend towards, and normally of the axis of, said cable, said axis extending between said sidewalls.

6. An indicating device as set forth in claim 5, said mounting means comprising a generally U-shaped member removably secured to said housing, and clamping screw means threaded through the bight of said member for engagement with said cable whereby said cable can be clamped between said sidewalls and said clamping screw means.

7. An indicating device for indicating the passage of a surge current through an electrical power cable, said device comprising:

housing means including means for mounting said device on said cable, said housing means having a pair of parallel wall portions which are spaced from, and which extend normally of, the axis of said cable when said device is mounted on said cable, and an end wall extending between said sidewalls, an indicator plunger mounted in said end wall, said plunger being movable between a retracted position and an extended position, said plunger extending beyond said end wall when in said extended position and being clearly visible, resilient means normally biasing said plunger to said extended position, disengageable latch means in said housing, said latch means being engageable with said plunger to hold said plunger in said retracted position, said latch means having an arm which extends towards said cable when said latch means is in latching engagement with said plunger, a metallic delatching vane between said sidewalls, said vane being pivotally mounted on an axis extending parallel to, and being spaced from, said cable, said vane having portions which are normally spaced from said arm, said vane being rotatable about said axis upon passage of a surge current through said cable under the influence of the magnetic field caused by said current whereby, said vane moves against said arm and disengages said latch arm from said plunger, and said plunger moves to its extended position to indicate previous passage of said surge current through said cable.

* * * * *